United States Patent
Joseph

(10) Patent No.: US 10,628,219 B2
(45) Date of Patent: Apr. 21, 2020

(54) FUZZY MANAGEMENT OF HIGH-VOLUME CONCURRENT PROCESSES

(71) Applicant: Oracle International Corporation, Redwood Shores, CA (US)

(72) Inventor: Jeevan Gheevarghese Joseph, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 157 days.

(21) Appl. No.: 16/004,608

(22) Filed: Jun. 11, 2018

(65) Prior Publication Data
US 2019/0377605 A1 Dec. 12, 2019

(51) Int. Cl.
G06F 9/50 (2006.01)

(52) U.S. Cl.
CPC .... *G06F 9/5011* (2013.01); *G06F 2209/5013* (2013.01)

(58) Field of Classification Search
None
See application file for complete search history.

(56) References Cited

U.S. PATENT DOCUMENTS

| | | | |
|---|---|---|---|
| 6,918,059 B1 | 7/2005 | Galuten et al. | |
| 7,305,371 B2 | 12/2007 | Brueckner et al. | |
| 8,707,111 B2 | 4/2014 | Ye et al. | |
| 2012/0311016 A1 | 12/2012 | DeAnna et al. | |
| 2017/0269972 A1* | 9/2017 | Hosabettu | G06F 9/46 |
| 2019/0049931 A1* | 2/2019 | Tschirschnitz | G05B 19/41895 |
| 2019/0171845 A1* | 6/2019 | Dotan-Cohen | H04L 63/105 |

OTHER PUBLICATIONS

Ahn, Lightweight Fault-Tolerance Mechanism for Distributed Mobile Agent-Based Monitoring, 6th IEEE Consumer Communications and Networking Conference, Available on internet at: ieeexplore.ieee.org/stamp/stamp.jsp?tp=&arnumber=4784958&isnumber=4784684, Jan. 2009, pp. 1-5.

Arfat et al., A Survey on Fault Tolerant Multi Agent System, I.J. Information Technology and Computer Science, vol. 9, Available on internet at: www.mecs-press.org/ijitcs/ijitcs-v8-n9/IJITCS-V8-N9-6.pdf, Sep. 2016, pp. 39-48.

Cheikhrouhou et al., Intelligent Agents for Network Management: Fault Detection Experiment, Proceedings of the Sixth IFIP/IEEE International Symposium on Integrated Network Management, Available on internet at: www.eurecom.fr/en/publication/237/download/ce-cheimo-990524.pdf, May 1999, 15 pages.

(Continued)

*Primary Examiner* — Eric C Wai
(74) *Attorney, Agent, or Firm* — Kilpatrick Townsend & Stockton LLP

(57) ABSTRACT

Embodiments relate to dynamically configuring a swarm of processing bots to autonomously execute tasks corresponding to a request. A communications fabric enables broadcasts of processing and status data from individual bots to other bots, which can locally determine whether and/or how the communications are to affect its processing.

20 Claims, 6 Drawing Sheets

(56) References Cited

OTHER PUBLICATIONS

Chen et al., A Dynamic Resource Scheduling Method Based on Fuzzy Control Theory in Cloud Environment, Journal of Control Science and Engineering, vol. 2015, Article ID 383209, Available on internet at: www.hindawi.com/journals/jcse/2015/383209/, Jun. 2, 2015, 10 pages.

Gray et al., Mobile Agents: The Next Generation in Distributed Computing, Proceedings of IEEE International Symposium on Parallel Algorithms Architecture Synthesis, Available on internet at: www2.cs.dartmouth.edu/~dfk/papers/gray:mobile.pdf, Mar. 1997, pp. 8-24.

Satzger et al., Autonomous and Scalable Failure Detection in Distributed Systems, International Journal of Autonomous and Adaptive Communications Systems, vol. 4, Issue 1, Available on internet at: dl.acm.org/citation.cfm?id=1923672, Dec. 2011, pp. 61-77.

\* cited by examiner

300

FUZZY MANAGEMENT OF HIGH-VOLUME CONCURRENT PROCESSES

FIELD

Embodiments relate to dynamically configuring a swarm of processing bots to autonomously execute tasks corresponding to a request. A communications fabric enables broadcasts of processing and status data from individual bots to other bots, which can locally determine whether and/or how the communications are to affect its processing.

BACKGROUND

Computing systems frequently are statically configured to perform computations in a defined manner. However, the environment in while the computing system is operating is often highly dynamic. A quantity of requests received can vary widely across time periods, external resources can fluctuate in their responsiveness, and/or the size and complexity of data to be processed across requests can be unpredictably and dramatically different. The statically configured computing system may thus frequently operate at sub-optimal efficiencies. Some approaches have introduced middleware to facilitate management and coordination of resources. However, middleware approaches are typically expensive and are inefficient when operated at scale, due to delays introduced by synchronizing operations and lock management.

SUMMARY

In some embodiments, a computer-implemented method is provided. A request for data is detected. A chatter-processing rule is retrieved that indicates one or more criteria for changing operation states while performing bot-based processing. At least part of the request is assigned to a coordinating bot of a processing subsystem of a computing system. A set of processing bots is generated by the coordinating bot to operate at the processing subsystem and to perform processing for the at least part of the request. Each processing bot of the set of processing bots is assigned one or more tasks of a set of tasks to perform. The set of tasks is defined such that performance of the set of tasks corresponds to processing of the at least part of the request. A communications fabric is enabled to route communications broadcasted from individual processing bots within a swarm of bots to other processing bots within a swarm of bots. The swarm of bots includes the set of processing bots. Autonomous processing is performed across the set of processing bots by, for each bot of the set of processing bots, performing the assigned one or more tasks of the set of tasks. During at least part of the autonomous processing and at a processing bot of the swarm of bots, one or more communications are received across the communications fabric. Each communication of the one or more communications is from another processing bot of the swarm of bots and indicates a status of the other processing bot or a result of performance of part or all of the one or more tasks assigned to the other processing bot. During at least part of the autonomous processing and at a processing bot of the swarm of bots, a determination is made, based on the one or more communications and the chatter-processing rule, that a criterion of the one or more criteria is satisfied and an operation state of the processing bot is changed to cease performance of the one or more tasks.

In some embodiments, a computer-program product is provided that is tangibly embodied in a non-transitory machine-readable storage medium. The computer-program product can include instructions configured to cause a processing subsystem that includes one or more data processors to perform operations of part or all of one or more methods disclosed herein.

In some embodiments, a system is provided that includes a processing subsystem that includes one or more data processors and a non-transitory computer readable storage medium containing instructions which, when executed on the processing subsystem, cause the one or more processing subsystem to perform operations of part or all of one or more methods disclosed herein.

BRIEF DESCRIPTION OF THE DRAWINGS

Illustrative embodiments of the present invention are described in detail below with reference to the following drawing figures.

DESCRIPTION

Figure 1:
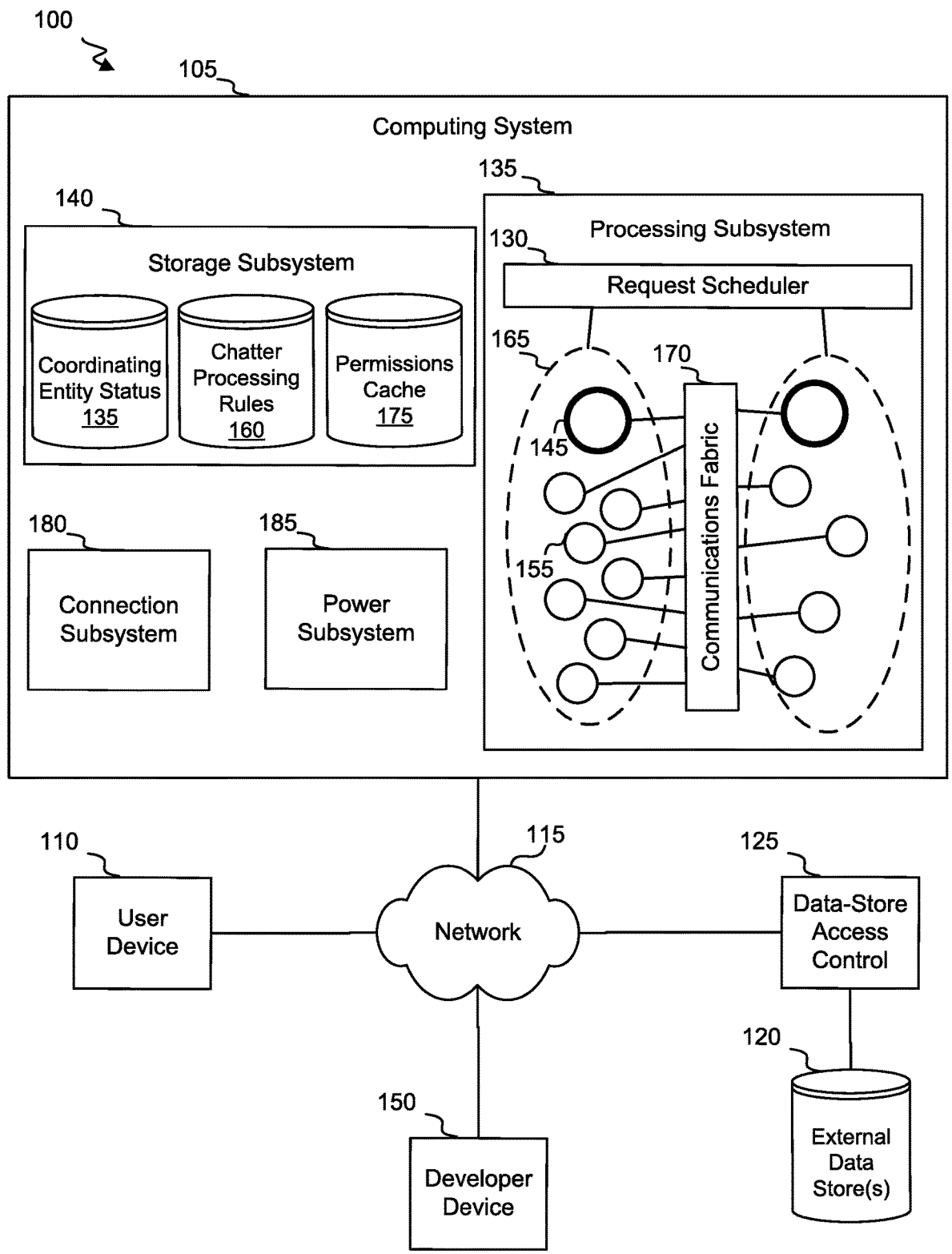
FIG. 1 shows an example of an interaction system for providing distributed processing.

In some embodiments, systems and methods are provided that facilitate dynamically configuring a processing subsystem of a system to promote elastic scaling and fast task-processing adaptations to external events (e.g., unresponsiveness of an external resource). The processing subsystem can generate a directed graph model for each request. The graph model can include a set of connected bots, and each bot can correspond to one or more processing tasks to be performed as part of a processing of the request. The graph model can be directional, so as to represent an order in which processing tasks are to be performed. One or more coordinating bots (e.g., each corresponding to an execution of a code block) can (optionally) be assigned to the coordinate at least part of the request and generate, for each bot of the graph, a processing bot configured to autonomously perform the processing of the one or more tasks. Coordinating bots may be particularly useful to facilitate group processing bots for distributed processing of individual queries.

The coordinating bot and processing bots can communicate or "chatter" over a communications fabric to broadcast various events (e.g., task completions, successful or unsuccessful use of a particular resource and/or a change in an operational status of the bot) to each other bot connected to the communications fabric. Each bot can independently assess the chatter in accordance with one or more chatter-processing rules to determine whether to change its operation. For example, a rule can indicate that detecting select types of communications and/or pattern of communications (e.g., a threshold number of a particular type of communication within a defined time period) is to trigger the bot to cease some or all of its operation. Accordingly, a swarm of processing bots associated with one or more requests may automatically and autonomously cease processing, so as to avail processing resources for other requests.

It will be appreciated that the communications fabric can thus serve to render point-to-point (or bot-to-bot) communication unnecessary and unused. Communication between two bots can occur over the fabric, but is coincidental, likely due to a configuration of a directed graph. For example, three processing bots can be assigned to a portion of a task. A first bot can break down the task to two subtasks, which a second bot and third bot are to perform. The first bot can broadcast a message for each task, which can be picked up by the second and third bots. Thus, the first bot ended up communicating with the second and third bots independently, but that was coincidental, as the first bot had not specifically targeted either of the second or third bots. Rather, the first bot was independently configured to generally facilitate assignment of the two tasks, and the directed graph's configuration ensures that—for each of the tasks—a single processing bot reacts to the task.

The accessibility of the chatter to each bot facilitates rapid changes to processing as well. For example, a processing bot can detect that an operation-change criterion is satisfied while in the midst of performing a set of tasks—it need not wait until the entire set is completed to detect the potential issue. As another example, a coordinating bot can assess progress with respect to a single task or group of tasks to determine whether to reconfigure the graph model, change its own state to indicate that new tasks are not be accepted for coordination, and/or redefine one or more processing bots. As yet another example, a changed or new chatter-processing rule can rapidly propagate throughout the swarm, even while various bots are performing tasks. For example, after detecting that a criterion was satisfied, it may be determined that an associated resource remains operational and/or that one or more anomalies resulted in events giving rise to the satisfaction. A chatter-processing rule can then be updated to adjust an event threshold, such that other bots avoid changing or ceasing their operations.

It will be appreciated that chatter-processing rules can be stacked, such that some rules are configured to specify actions to occur when another rule is changed. In some instances, a rule can react to a change in another rule by changing a swarm processing, which can result in yet another rule to be changed, and so on. An environment is flexibly defined, such that a developer has a mechanism to specify, as a set of rules, operations to occur under normal circumstances and other operations to occur under abnormal circumstances. Rules can be stacked to build increasingly automated systems, as more edge cases and conditions are covered by the rules.

FIG. 1 shows an example of an interaction system 100 for providing distributed processing. Interaction system 100 includes a computing system 105 configured to perform concurrent processing of tasks using a dynamically configured processing architecture. More specifically, a user device 110 transmits a request for data, over a network 115 (e.g., the Internet, a wide-area network, a local-area network or a wired connection), to computing system 105. The requested data can correspond to processed versions of data collected from one or more external data sources, such as an external data store 120.

Interaction system 110 can also include a data-store access control 125, which can include a computing system that controls access to external data store 120. The control can include validating a permission of user device 110 and/or computing system 105 to access external data store 120 (or a sub-portion thereof). The control can further or alternatively include effecting access constraints, such as a limit on a frequency or count at which external data store 120 (or a sub-portion thereof) can be accessed by user device 110 and/or computing system 105.

As one particular example, a request from user device 110 can include multiple constraints and can correspond to a request for the data matching each constraints and/or a characteristic of the matching data. Thus, processing the request can include validating permission data to confirm that user device 110 is authorized to access pertinent data, querying the one or more external data sources (and/or a locally controlled data store) using the constraint(s), and assessing the query results.

Computing system 105 can dynamically configure a set of bots to perform processing response to individual requests. The set of bots can include a request scheduler 130 that detects processing requests. Request scheduler 130 then determines whether one or more coordinating bots (associated with different task types) are available to coordinate processing the request. Each coordinating bot can be configured to transform all task broadcast chatter (e.g., from processing nodes) over the communications fabric. Specifically, the coordinating bot can transform each message to add metadata that indicates which other bots are to listen to the message. The other bot(s) can include each bot that is to further process a result identified in a message and/or to change its operation based on a message's indication. The added metadata can be specific enough such that only a single processing bot (or a small set of bots) is to listen to a transformed message. This processing thus can improve efficiency by avoiding expensive and complex synchronization operations. Further, horizontal scaling can be facilitated, due to bots being lightweight.

In one instance, request scheduler 130 may be configured to maintain a coordinating-bot status data structure 135 in a local storage subsystem 140 that indicates a most recent availability status of each coordinating bot. Individual coordinating bots can update their status (e.g., by posting chatter on the communication fabric) based on processing loads (e.g., a quantity of active processing bots being coordinated), resource responsiveness, etc. The status updating can thus be performed in a decentralized manner. Request scheduler 130 can identify the status of one or more particular coordinating bots associated with task types applicable to the task. If none of the particular coordinating bots (or, in other instances, if at least one of the particular coordinating bots) is not available, request scheduler 130 may delay processing of the request until the particular coordinating bots (or bot) are available or return an error to a requestor (e.g., other device or system or other application executing at computing system 105) indicating that the request will not be processed. In some instances, a responsive action (e.g., a delay, error response or new coordinating-bot generation) is selected based on a current processing or request load.

When request scheduler 130 detects that the one or more particular coordinating bots 145 are available, request scheduler 130 assigns individual actions to individual coordinating bots of the one or more particular bots. Coordinating bot 145 is configured to generate a processing bot (or worker bot) to perform one or more tasks associated with the request, monitor communications from the one or more bots and/or generate additional processing bots to add to the swarm in view of the monitored communications. It will be appreciated that coordinating bot 145 can generate a processing bot for each of multiple requests, such that a single coordinating bot can generate and manage multiple processing bots.

An initial processing of the request can include generating a directed graph for the request (e.g., based on one or more graph-generating configurations, which may have been received from a developer device 150). The directed graph can include a set of connected nodes, with each node identifying one or more tasks to be performed. Connections between the nodes can be directional and indicate an order in which tasks are to be performed. The graph can indicate one or more resources (e.g., data stores) that are to be accessed during performance of a task. In some instances, the graph can indicate subsets of tasks that are to be independently performed, such that operation of a first subset of tasks (e.g., involving a first resource) does not influence operation of a second subset of tasks (e.g., involving a second resource) and operation of the second subset does not influence operation of the first subset. In some instances, the graph can identify actions to be performed in response to detecting a specified event. A single event may trigger different actions at different bots. For example, detection of a failure of an action could lead to circuit breakers being triggered to fast fail a request, while another bot may respond to the event by attempting to reestablish a connection to the failed device. In some instances, request scheduler 130 generates the directed graph and assigns a coordinating bot to each task subset (or to all tasks if no independent subsets are identified). Thus, a coordinating bot 145 can be associated with a single node or multiple nodes of the directed graph. Similarly, a processing bot 155 generated by a coordinating bot 145 can be assigned the task(s) associated with a single node or multiple nodes. In one instance, each coordinating bot and each processing bot are associated with the task(s) corresponding to an individual node and can reflect dependencies as indicated by any connections extending to or from the node.

Each processing bot 155 is configured to autonomously perform the task(s) to which it is assigned. Performing the task can include utilizing and/or communicating with one or more resources, which can include a resource external to computing system 105, such as external data store 120. Each processing bot 155 can further be configured to use a directed graph to identify a task occlusion associated with an assigned task. The occlusion can occur when the assigned task is redundant or unnecessary (e.g., providing no additional useful information) given one or more other task results.

Storage subsystem 140 can include a set of chatter processing rules 160, which can indicate how one or more bots (e.g., processing bots and/or coordinating bots) are to respond to various types of "chatter" or inter-bot communication. Chatter processing rules 160 can be defined, at least in part, based on specifications (and/or the rules themselves) received from developer device 150. The chatter processing rules can indicate (for example) how an bot is to respond to various individual types of communications, communication patterns, types of responses from a resource (e.g., an error response), a lack of response from a resource, and/or extended processing time. To illustrate, a rule can indicate that processing bot 150 is to terminate its operation (so as to disappear from the swarm) upon detecting at least a threshold number of communications indicating errors or unresponsiveness indications corresponding to a particular resource used in the processing bot's assigned task(s).

Chatter processing rules 160 can be defined such that different rules apply to different types of bots (e.g., processing bots versus coordinating bots), different resources, and/or different types of requests. For example, chatter processing rules 160 may indicate that, upon detecting at least 5 communications within a previous 30 seconds that indicates that Resource X is unresponsive, processing bots associated with Resource X are to terminate operation, while a coordinating bot associated with Resource X is to generate a new processing bot that is configured to repeatedly ping Resource X. The ping action can be configured to check for availability of a shared resource. A coordinating bot in this instance can preemptively deny request processing and dispatch a new processing bot to continuously and/or repeatedly attempt to verify availability of Resource X and broadcast messages characterizing any results of the verification attempts over the common fabric. As another example, in response to detecting the unresponsiveness of Resource X, a coordinating bot can spawn up two processing bots—one to repeatedly check to determine whether Resource X becomes responsive to another to attempt to restart or reset Resource X. Thus, the system may be able to function to heal itself.

A set of bots 165 can include a coordinating bot 145 and one or more processing bots 155 and can be associated with (e.g., configured to perform and/or manage tasks for) part or all of multiple requests. Set of bots 165 (and/or multiple sets of bots) can be configured to operate as a swarm of bots, to be organized in a mesh topology and/or to use peer-to-peer communication. Each bot can include a piece of code that is configured to autonomously operate with respect to other bots. Though the bots can operate autonomously, they need not (though, in some in instances, they can) operate independently from each other. For example, an output from one bot can be further processed by another bot. As another example, an error or unresponsiveness reported by one or more bots can cause another bot to change or cease its operation.

Rather than directly communicating between bots or by selectively routing communications by a central management bot (e.g., or "hub"), communications can be broadcast from each source bot to all other bots within a swarm via a communications fabric 170. Communications fabric can identify, for each received communication, a corresponding swarm identifier. The communication can then be distributed across other bots in the swarm. The communication can be distributed via a push by communications fabric 170 upon receiving the communication. Rules specifying (for example) which tasks are to be performed and/or how data is to be processed can be pushed by individual bots or pulled (e.g., where a bot requests any new rule or rule update at regular intervals and/or when a processing-associated condition is met).

Upon receiving the communication, each bot can determine whether to perform an operation in response to the communication based on its local execution of an applicable chatter processing rule. The decision may be locally made by (for example) identifying one or more characteristics of a chatter communication (e.g., which bot is transmitting the communication, with which set of bots the transmitting bot is associated, and/or when the communication was received) and applying an initial attention rule to the characteristic(s) to determine whether to further evaluate content of the communication (e.g., in view of another rule).

An operation may include (for example) incrementing a count, updating an event data structure (e.g., that identifies an error and an associated time), ceasing operation and/or changing operation (e.g., to eliminate performing actions that correspond to a given resource). This autonomy facilitates supporting larger and/or more processing swarms, as central management of bot processing is not required. However, depending on configurations of chatter processing rules 160, the autonomy may result in slower response to a given event (e.g., unresponsiveness of a resource) and/or incomplete response to a given event (e.g., if an bot does not process potentially applicable chatter or processes it in an undesired manner).

It will be appreciated that processing performed by processing bots can include requesting and/or retrieving data from one or more external data stores 120 and/or from one or more locally managed data stores. For example, computing system 105 can maintain permissions data in a permissions cache 175 or permissions data store that indicates which users and/or user devices 110 are authorized to request various types (or any type) of processing at computing system 105. Thus, one type of processing that may be performed at processing subsystem can include (for example) performing a look-up using an user identifier, user-device identifier, profile identifier and/or login credentials at permissions cache 175 to determine whether to proceed with processing. If such authorization is not detected, the processing bot can broadcast the result over communications fabric 170, which can cause other processing bots to terminate processing.

Storage subsystem 140 can be implemented, e.g., using magnetic storage media, flash memory, other semiconductor memory (e.g., DRAM, SRAM), or any other non-transitory storage medium, or a combination of media, and can include volatile and/or non-volatile media. In various instances, some or all of the memory in storage subsystem 140 may be readable and writable or only readable.

Processing subsystem 135 can be implemented as one or more integrated circuits, e.g., one or more single-core or multi-core microprocessors or microcontrollers. In operation, processing system 135 can control the operation of computing system 105. In various embodiments, processing subsystem 135 can execute a variety of programs in response to program code and can maintain multiple concurrently executing programs, processes or bots. At any given time, some or all of the program code to be executed can be resident in processing subsystem 135 and/or in storage media such as storage subsystem 140.

Through suitable programming, processing subsystem 135 can provide various functionality for computing system 100. For example, in some embodiments, processing subsystem 135 can execute code to process a request to generate a directed graph, assign actions from the directed graph to coordinating bots, generate processing bots to perform tasks associated with the actions, and support communication between the bots via a communications fabric. Generation of an bot can include generating new bot-defining code that is stored at storage sub-system 140 and executed using processing subsystem 135. Assigning an action to a coordinating bot can include updating a data structure (e.g., coordinating bot status data store 135) to an unavailable status, associating an action identifier with an identifier of the coordinating bot, and/or availing data pertaining to the action to the coordinating bot.

Computing system 105 can include one or more computers and/or servers. Computing system 105 includes a connection subsystem 180 that enables computing system 105 to communicate with one or more other devices and/or that enables a part of computing system 105 (e.g., a first computer or server) to communicate with another part of computing system 105 (e.g., a second computer of server). Connection subsystem 180 can include (for example) a transceiver, receiver, transmitter, antenna, and/or wire port, as well as supporting circuitry to enable data communication. Connection subsystem 180 can be configured to enable data communication over a wireless medium or across a wired connection.

In some embodiments, computing system 105 includes a power subsystem 185 that can provide power management capabilities and power for computing system 105. Power subsystem 185 can include circuitry to distribute received, converted and/or stored power to other components of computing system 105 that require electrical power. Power subsystem 185 can include a battery and/or circuitry to receive power from another source (e.g., an AC source).

It will be appreciated that, while FIG. 1 depicts interaction system 100 as including a single user device 110, a single data-store access control 125, and a single developer device 150, other system configurations that include multiple user devices 110, data-store access controls 125 and developer devices 150 are contemplated. Further, also contemplated are instances in which computing system 105 accesses data from multiple external data stores, each of which are controlled by different data-store access controls and/or bots.

Figure 2:
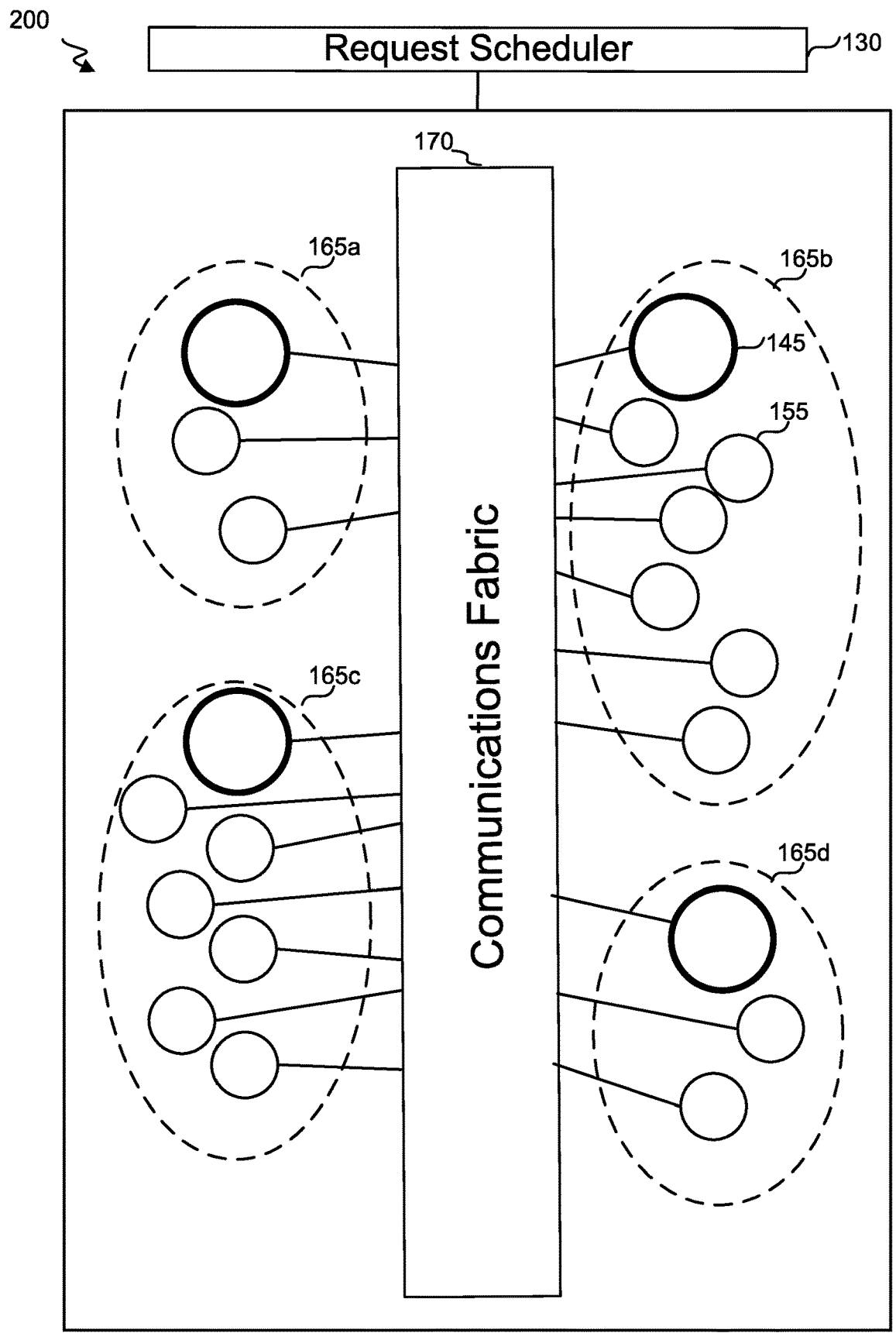
FIG. 2 illustrates an example of processing subsystem that includes a dynamic set of processing bots.

FIG. 2 illustrates an example of processing subsystem that includes a dynamic set of processing bots. In this instance, request scheduler 130 has received a two requests from two user devices. Each request is requesting information pertaining to a set of records (e.g., user profiles) that have each of multiple characteristics. The first request has identified four criteria (e.g., having location data corresponding to Colorado, having profile data indicating that a user is between 18 and 35 years old, having profile data indicating that the user subscribes to a service for providing electronic music or video content, and having purchased at least two electronics items online in the last six months) that pertain to information stored at four separate external data stores. The second request has identified two criteria that pertain to information stored at two separate data stores.

Request scheduler 130 then processes the each request to identify a directed graph. The graph can indicate that four actions are to be performed. A first action is to validate credentials associated with the request (e.g., login information and/or a device identifier) to ensure that user device 110 is authorized to receive record information from computing system 105. For example, a look-up task can be performed. A second action is to confirm that a user and/or user device 110 associated with the request is authorized to access the external data stores. The second action can be sub-divided into multiple (e.g., two or four) tasks—each corresponding to one of the data stores corresponding to the request's constraints. A third action can include requesting, from each data store, identifiers of records that correspond to one of the characteristic. Again, the third action can be sub-divided into multiple (e.g., two or four) tasks—each corresponding to one of the one of the request's constraints. A fourth action can identify the intersection of records identified in response to the third action and to assess any constraints on returning identifying information for the intersection of records.

Request scheduler 130 assigns each action to a different coordinating bot 145, which can generate one or more processing bots 155. Thus, four sets of bots 165a-165d are used during processing of each of the first and second requests. A first set of bots 165a performs validation for accessing computing system 105 (validating a device corresponding to the first request at a first processing bot and validating a device corresponding to the second request at a second processing bot), a second set of bots 165b performs authorization for accessing the data stores (four processing bots performing authorization for the first request in correspondence to the four data stores and two processing bots performing authorization for the second request in correspondence to the two data stores), a third set of bots 165c requests record data from the data stores (with four processing bots corresponding to the first request and two corresponding to the second request), and a fourth set of bots 165d processes—for each of the requests—the combined record data.

Each of the bots is connected to communications fabric 170. Thus, a communication from any of the bots in any of the four sets of bots 165a-165d is broadcast to each other bot in the four sets of bots 165a-165d. Receiving bots can then determine whether and/or how to react to the communications based on rules. For example, if a processing bot determines that a user device is not authorized to access a third data store, an bot from third set of bots 165c that was generated to request data from the third data store may terminate and/or an bot from fourth set of bots 165d configured to aggregate and process record data can reconfigure itself to not depend on the results from a response from the third data store.

Thus, various sets of bots are generated—each including a coordinating bot and multiple processing bots corresponding to multiple requests. It will be appreciated that, in some instances, requests can differ in terms of the actions to be performed, such one request's actions are assigned to a different set of bots than are another request's actions. Further, processing bots coordinated by a given coordinating bot need not correspond to all pending requests. Further, in some instances, actions and/or tasks assigned to an individual coordinating bot and/or processing bot can correspond to multiple nodes on the directed graph.

It will also be appreciated that, in some instances, different interconnects are configured within communications fabric 170, such that communications from a given bot can be broadcast to an incomplete subset of bots (corresponding to those bots connected to the interconnect).

Figure 3A:
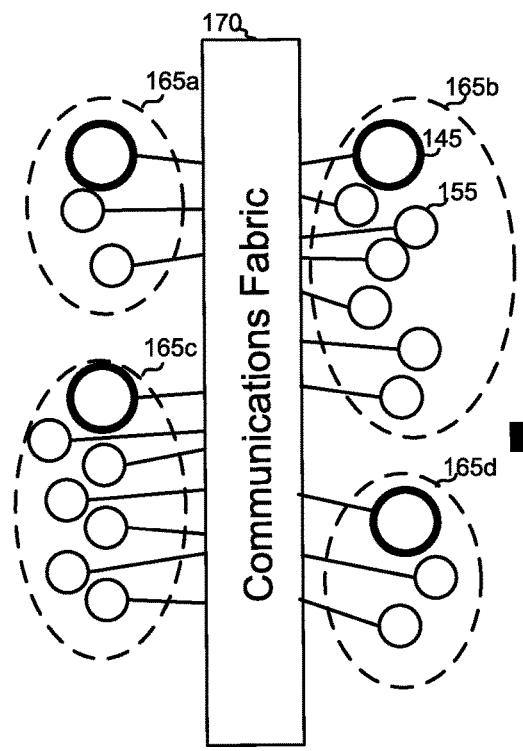
FIGS. 3A-3B illustrate an example of a transition between bot configurations of a processing subsystem.
Figure 3B:
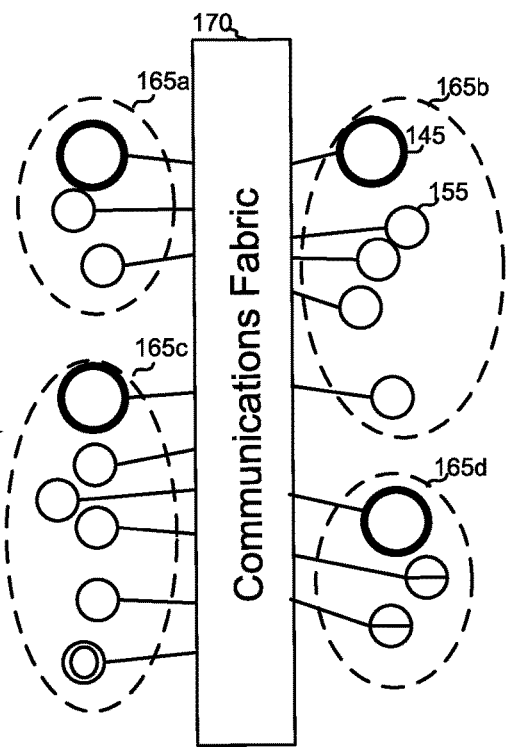

FIGS. 3A-3B illustrates an example of a transition between bot configurations of a processing subsystem. FIG. 3A shows the bots of the first through fourth sets of bots corresponding to the first and second requests, as in FIG. 2.

In this example, a particular data-store access control becomes unresponsive. A processing bot from second set of bots 165b can transmit an authorization request and detect that no response has been received within a threshold period of time. The processing bot can broadcast this event to all other nodes, with the broadcast identifying (for example) an identifier of the processing bot, an identifier of the first request, an identifier of a resource corresponding to the particular data-store access control, and an indication that a time-out occurred. Some of the other bots can detect that the communication corresponds to a resource related to their local processing. A rule can indicate that their operation is to change if three time-outs or errors are detected within a minute. Thus, each of these listening bots can note the time and the event to determine whether the threshold will be reached.

The processing bot can request the authorization response again and again detect a timeout. Thus, a second communication is broadcast and the listening bots again notes the time and event. Then a processing bot for third set of bots 165c can similarly detect a timeout and broadcast a similar communication. At this time, other bots, upon detecting the communication, can determine that three timeout events occurred within a minute, and the criterion of the rule is thus fulfilled.

The response to the criterion fulfillment can (but need not) vary across bots. For example, some bots (e.g., those for which all assigned tasks involve the particular resource) are to store any incomplete results and then terminate processing, such that they are no longer represented in FIG. 3B. Some bots are to change their processing. A change in processing can include performing a processing of aggregated data but so as to as exclude consideration of data indicated as being associated with the particular resource. A change in processing can include spinning up (e.g., by a coordinating bot) a new processing bot to repeatedly check to determine whether the particular data store becomes responsive and to broadcast any successful attempt and/or to adjust calculations to not rely on the particular data store. These changed-processing bots are represented with a horizontal line in FIG. 3B. The new resource-polling bot is represented with a double circle in FIG. 3B. Thus, FIGS. 3A and 3B illustrate how the configuration of bots can be dynamic and respond to chatter and/or locally detected events. In some instances (not shown), satisfaction of the criterion can result re-configuring a set of bots to an extent to which a coordinating bot no longer has monitoring tasks to perform. The coordinating bot may then broadcast a communication that indicates that it is free to facilitate processing of other requests.

If the new resource-polling bot detects that the resource has become responsive, a communication can be broadcast indicating the responsiveness and identifying the resource. The request scheduler and/or one or more coordinating bots can then determine whether any requests corresponding to any related stored incomplete result remains pending. If so, a coordinating bot can be assigned to generate one or more processing bots to resume and complete processing using the incomplete result(s) and the particular resource.

It will be appreciated that, in time, what types of messages particular bots respond to can change. For example, a coordinating bot can be configured to react to new requests. However, the coordinating bot can stop reacting to new request upon detecting a critical system failure. Until the coordinating bot detects a message indicating that the system is restored, it can continue to stop reacting to new requests. Once such an indication is detected, the coordinating bot can again begin detecting and reacting to new requests (e.g., by defining one or more tasks to be performed by processing bots for the task).

The communications fabric can distribute all messages to all connected bots. However, individual bots can apply a filter (e.g., bit mask), such that only messages pertinent to their potential processing are locally detected. More specifically, a filter can identify particular characteristics of metadata (e.g., having been added by a coordinating node) that are to trigger evaluation of the message. Filters may change based on (for example) a stage of task performance, a current rule configuration, etc.

Figure 4:
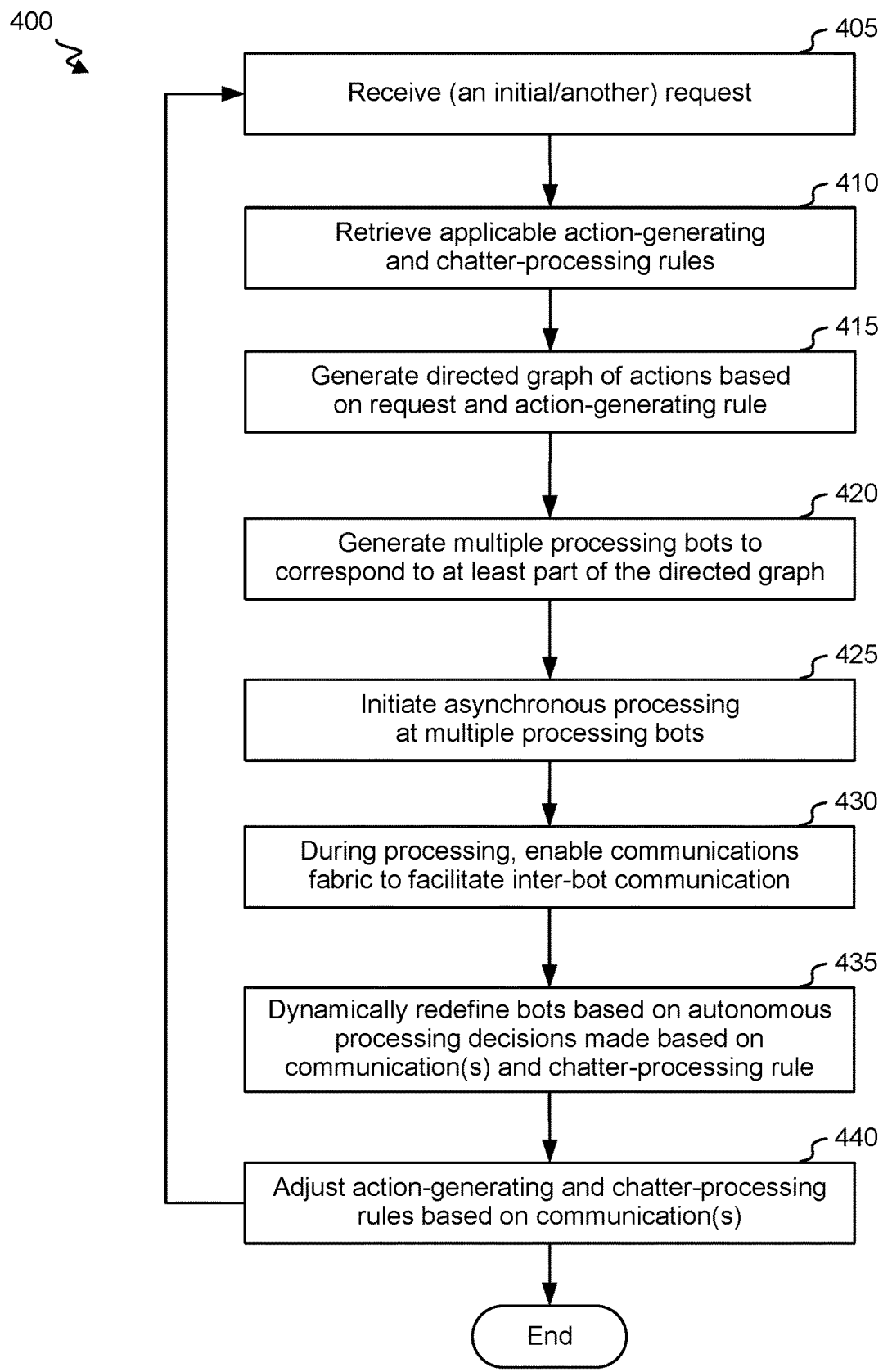
FIG. 4 shows a flowchart for a process for dynamically configuring swarms of processing bots in response to requests and inter-bot communications according to some embodiments.

FIG. 4 shows a flowchart for a process 400 for dynamically configuring swarms of processing bots in response to requests and inter-bot communications according to some embodiments. Process 400 begins at block 405 where an initial request is received (e.g., at a request scheduler). The request can be received from a user device and can include one or more specifications of data being requested.

At block 410, rules that are applicable to the requests are retrieved (e.g., by the request scheduler) from a storage sub-system. The rules can be identified based on (for example) the user device, the user and/or the data being requested (e.g., the one or more specifications and/or any resource identified in the request). The rules may have been generated based on one or more specifications or definitions received from a developer device. The rules can include an action-generating rule, which indicates how a request is to be transformed into one or more discrete actions to be performed to process the request. The action-generating rule can include one or more indications about how to generated a directed graph based on the request. In some instances, the rules further include one or more task-generating rules, which indicates how to transform an action into one or more tasks that can be autonomously performed.

The rules can further include one or more chatter-processing rules, which indicate how individual bots are to respond (or not to respond) to various types of chatter or communication from other bots. For example, a chatter-processing rule can identify types of communications of potential relevance, how to track events across communications, criterion for changing a performance responsive to an event or event pattern and/or how a performance of an bot is to change in response to detecting that the criterion is satisfied. In some instances, different chatter-processing rules apply to different types of bots (e.g., coordinating bots versus processing bots, bots corresponding to different resources, request originating from different systems or types of user devices, etc.).

At block 415, a directed graph is generated (e.g., by the request scheduler) based on the request and the action-generating rule. The directed graph can include an ordered set of nodes. Each node of the ordered set of nodes can be associated with an action to be performed. In some instances, nodes are configured to indicate which tasks can be performed in parallel and which have a dependency that can require waiting on completion of a previous task. Each task that can be performed in parallel can be grouped together into an action and represented by a node.

At block 420, multiple processing bots is generated to correspond to the directed graph. Block 420 can include assigning, for each node of the set of nodes, an action represented by the node to a particular coordinating bot. The particular coordinating bot can then identify a one or more tasks that correspond to the action and that can be performed autonomously. The coordinating bot can then generate a processing bot for each of the one or more tasks. Thus, the multiple processing bots may be associated with different coordinating bots. The generation can include generating a piece of code for each coordinating bot and initiating autonomous processing of the piece of code.

At block 425, asynchronous processing at the multiple processing bots is initiated (e.g., by initiating execution of code associated with each of the swarm of processing bots). At block 430, during processing, a communications fabric is enabled to facilitate inter-bot communication. The communications fabric can be configured to transmit each communication to each bot (e.g., of some or all of the multiple processing bots, one or more coordinating bots and/or one or more other processing and/or coordinating bots not associated with the request) or to maintain the communication and transmit the communication upon receiving a request from any bot in the set.

At block 435, the multiple processing bots is dynamically redefined based on autonomous bot decisions made based on the communication(s) and the chatter-processing rule. That is, each bot can apply one or more applicable chatter-processing rules to for which communications content is to be assessed and/or how communication content is to be assessed. A rule can indicate that a given bot is to terminate its processing upon detecting particular conditions, that a new bot is to be generated and/or that processing is to change. Thus, the multiple bots that are executing instructions (e.g., and/or a superset swarm of bots that pertains to the request and to other requests) can dynamically change.

At block 440, one or more rules (e.g., one or more of the action-generating and chatter-processing rules) can be changed based on the communication(s). For example, if it is determined that a resource is non-responsive, an adjustment can include changing an action-generating rule to omit actions involving the resource. As another example, a request-intake rule can be defined or adjusted to cease accepting requests involving the resource (e.g., and instead return an error message to the requesting device) until an bot communicates that the resource is responsive. Due to the decentralized bot topology, rule changes may (in some instances) not be able to be immediately effected at each bot. Rather, a rule change can be broadcast and/or distributed via the communications fabric, but it is possible that other processing and/or other rules at a given bot can delay or even prevent its detection and/or acceptance of the change. Nonetheless, the same architecture provides scalability and asynchronous-processing efficiency advantages.

Process 400 can return to block 405 to begin receiving and processing other requests using the adjusted rules.

Figure 5:
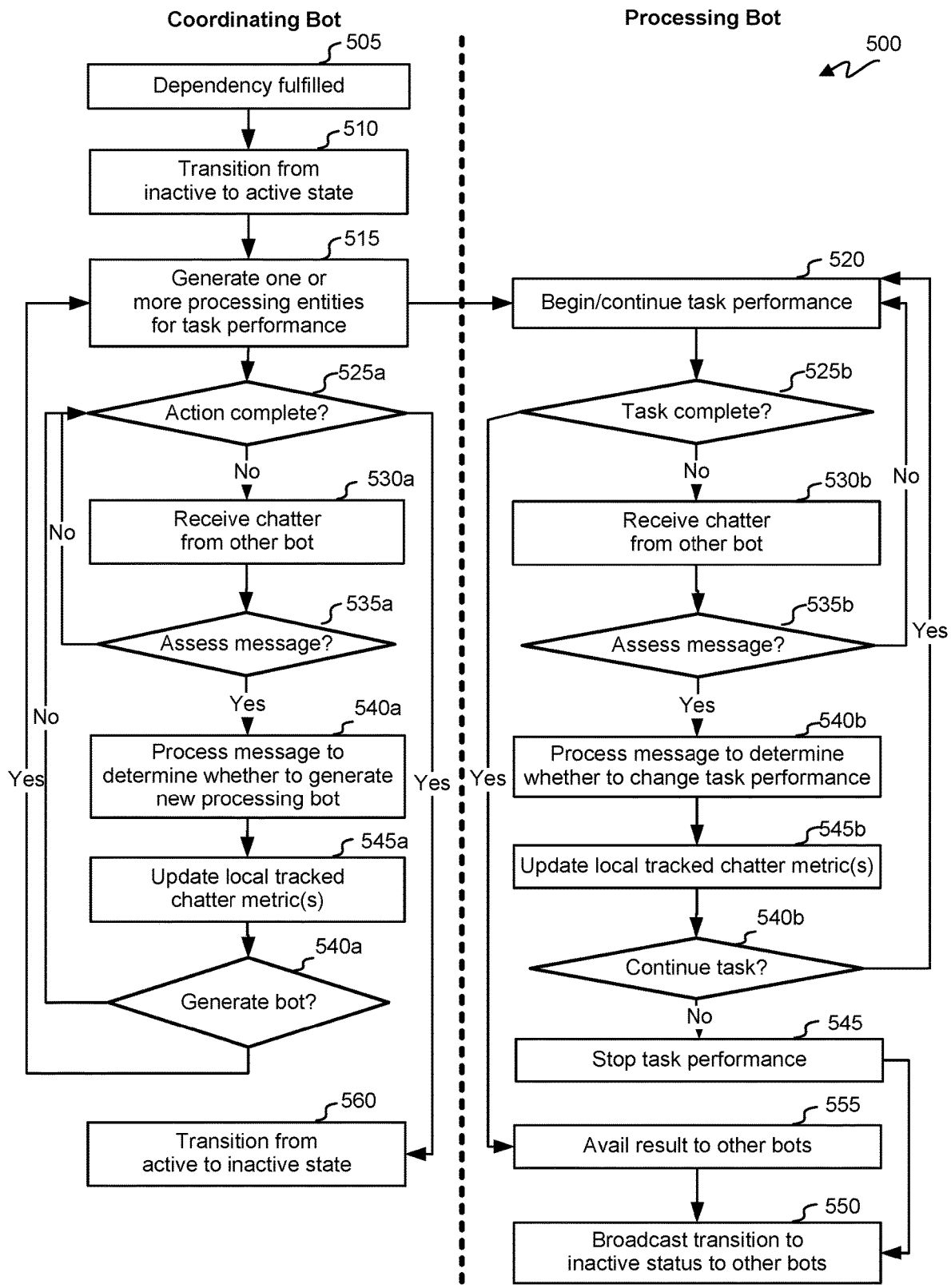
FIG. 5 shows a flow diagram for using bots' processing and communications to handle tasks according to some embodiments.

FIG. 5 shows a flow diagram for using bots' processing and communications to handle tasks according to some embodiments. The diagram illustrates how two bots may respond differently to a same type of communication chatter.

At block 505, a coordinating bot detects that a dependency for initiating action processing is fulfilled. For example, the dependency can be configured to be fulfilled when an instruction (e.g., to coordinate performance of part or all of a request, to coordinate performance of an action and/or to generate one or more processing bots) is received from a request scheduler and/or when a status of the coordinating bot (e.g., when the request is received) indicates that the coordinating bot is available to coordinate task performance.

At block 510, in response to detecting fulfillment of the dependency, the coordinating bot transitioned from an inactive state to an active state. The transition can include initiating execution of the coordinating bot's code. The transition can cause a status of the bot to change (e.g., from an "Available" status to an "Unavailable" or "Busy" status). The transition can include updating a status in a coordinating-bot status data structure to indicate the bot's active state or unavailable or busy status.

At block 515, the coordinating bot generates one or more processing bots to perform one or more tasks corresponding to the action and/or request associated with the dependency. In some instances, the one or more processing bots are generated to perform tasks that can be performed concurrently and/or autonomously relative to each other and/or other tasks being performed for other requests.

At block 520, a processing bot of the one or more processing bots begins performing a task assigned to the processing bot. The task can include (for example) requesting data from a local or remote data store and/or processing request data, retrieved data, and/or partly processed data in accordance with a definition of the task. The initiation of task performance can include transitioning of the processing bot from an inactive state to an active state, such that execution of the processing bot's code is initiated.

The coordinating bot can remain in the active state until it determines (at block 525a) that the action assigned to it is complete. The processing bot can remain in the active state until it determines (at block 525b) that the task(s) assigned to it are complete.

While the coordinating bot and the processing bot are in an active state, each bot can receive chatter (at blocks 530a and 530b) over a communications fabric from one or more other bots (and/or from each other). The one or more other bots can include one or more of the one or more processing bots generated by the coordinating bot at block 515 and/or one or more processing and/or coordinating bots associated with other actions and/or other requests. The chatter can include (for example) messages that indicate one or more results, resource responsiveness, state or status transitions, and/or rule updates.

At blocks 535a and 535b, the coordinating bot and the process bot determine whether to assess a message in the chatter. The determination can be based on a chatter-processing rule that applies to the bot. In some instances, a chatter-processing rule indicates that the message is to be assessed if the message indicates (e.g., via header information or message content) that the message relates to a resource, action, task type and/or request that matches to a resource, action, task type and/or request corresponding to an action and/or task assigned to the bot.

If it is determined that the message is not to be assessed, the bots can continue to receive and filter chatter messages. If it is determined that the message is to be assessed (by the coordinating bot and/or the processing bot), process 500 proceeds to process the message (at block 540a and/or block 540b, respectively).

At block 540a, when the coordinating bot is processing the message, the processing can include processing the message to determine whether to generate a new bot. At block 540b, when the processing bot is processing the message, the processing can include processing the message to determine whether to change local task performance.

In some instances, the processing includes a same or similar assessment. For example, each of block 540a and 540b can include determining whether a predefined pattern of events has been detected that indicates that a resource is not responsive (e.g., by detecting at least a threshold number of events indicating a timeout of requests to the resource and/or receipt of error responses from the resource). In some instances, the processing can differ across blocks 540a and 540b. For example, block 540b can including determining whether a predefined pattern of events has been detected that indicates that a resource is not response. But block 540a can include determining whether chatter has indicated that at least a threshold number of processing bots (e.g., generally, associated with a particular type of task, or associated with a particular resource) have deactivated and/or stopped task performance.

At blocks 545a and 545b, the respective bot updates one or more local tracked chatter metrics. For example, a metric can include a count indicating a number of times that a particular type of event was reported in chatter (e.g., within a predefined time period), and an update can include incrementing the count. As another example, a metric can include a vector of response times reported in chatter, and an update can include adding an element to the vector that indicates a reported response time. In some instances, the processing of the message performed at block 540a and/or 540b can be based on a previous metric. In some instances, blocks 540a and 545a are combined and/or blocks 540b and 545b are combined, such that the processing of the message is based on the updated metric(s).

At blocks 540a and 540b, a decision is made whether to change an bot's operation based on the processing of the message. However, the decision is different across the coordinating and processing bots. For the coordinating bot, at block 540a, a decision is made as to whether to generate a new processing bot. The new processing bot may be generated to perform a task that (for example) monitors a resource to determine whether it becomes responsive. When it is determined to generate a new bot, process 500 returns to block 515, where it can be determined whether the coordinating bot can generate the new bot. Otherwise, process 500 can return to block 525a, such that the coordinating bot can continue to receive and selectively process chatter so long as the action has not been completed (and/or the coordinating bot remains active).

Meanwhile, for the processing bot, at block 540b, a decision is made as to whether to continue performing the task. For example, it can be determined (in accordance with a rule) that task performance is to discontinue when the task involves a resource that has been associated with a threshold number (or ratio, relative to a number of requests) of timeouts and/or errors. When it is determined to continue the task, process 500 returns to block 520 to continue with task performance. Otherwise, process 500 proceeds to block 545, where the processing bot stops performing the task. At block 550, the processing bot can then broadcast that it is transitioning to an inactive status across the communications fabric to other bots. This action can complete the processing bot's operation, such that it can thereby terminate its execution and operational presence.

Further, when a determination is made at block 525b (after any given iteration) that a processing of an assigned task is complete, the processing bot can avail a result of the task performance to other bots. For example, the result can be broadcast across a communications fabric. The processing bot can then (at block 550) broadcast that it is transitioning to an inactive status across the communications fabric to other bots. This action can complete the processing bot's operation, such that it can thereby terminate its execution and operational presence.

When a determination is made at block 525a (after any given iteration) that a processing of an assigned action is complete, the coordinating bot can transition from the active to the inactive state. This transition can include ceasing execution of the coordinating bot's code. This transition can include or be accompanied by updating the coordinating-bot status data structure to indicate the bot's inactive state or an available.

Thus, process 500 illustrates how same chatter distributed across a communications fabric can result in different types of responsive operations at different bots.

It will be appreciated that variations of process 500 are contemplated. For example, at block 540b, it may be determined whether to pause task performance (e.g., in addition to and/or instead of whether to stop task performance). If so, the task performance may be paused at block 545 and the paused state can be broadcast to other bots. For example, a rule may indicate that performance relating to a particular resource is to be paused upon detecting at least a threshold number of indications that the particular resource denied a data request due to a maximum number of data requests having been processed within a time period (e.g., within a day). In some instances, the coordinating bot responds to a same type of detection by generating a new bot to monitor the resource's responsiveness. Task performance may be resumed at the processing bot (for example) upon detecting that a resuming condition (e.g., that a particular time of day has passed or that another bot has indicated via chatter that the resource is processing requests) has been satisfied.

Figure 6:
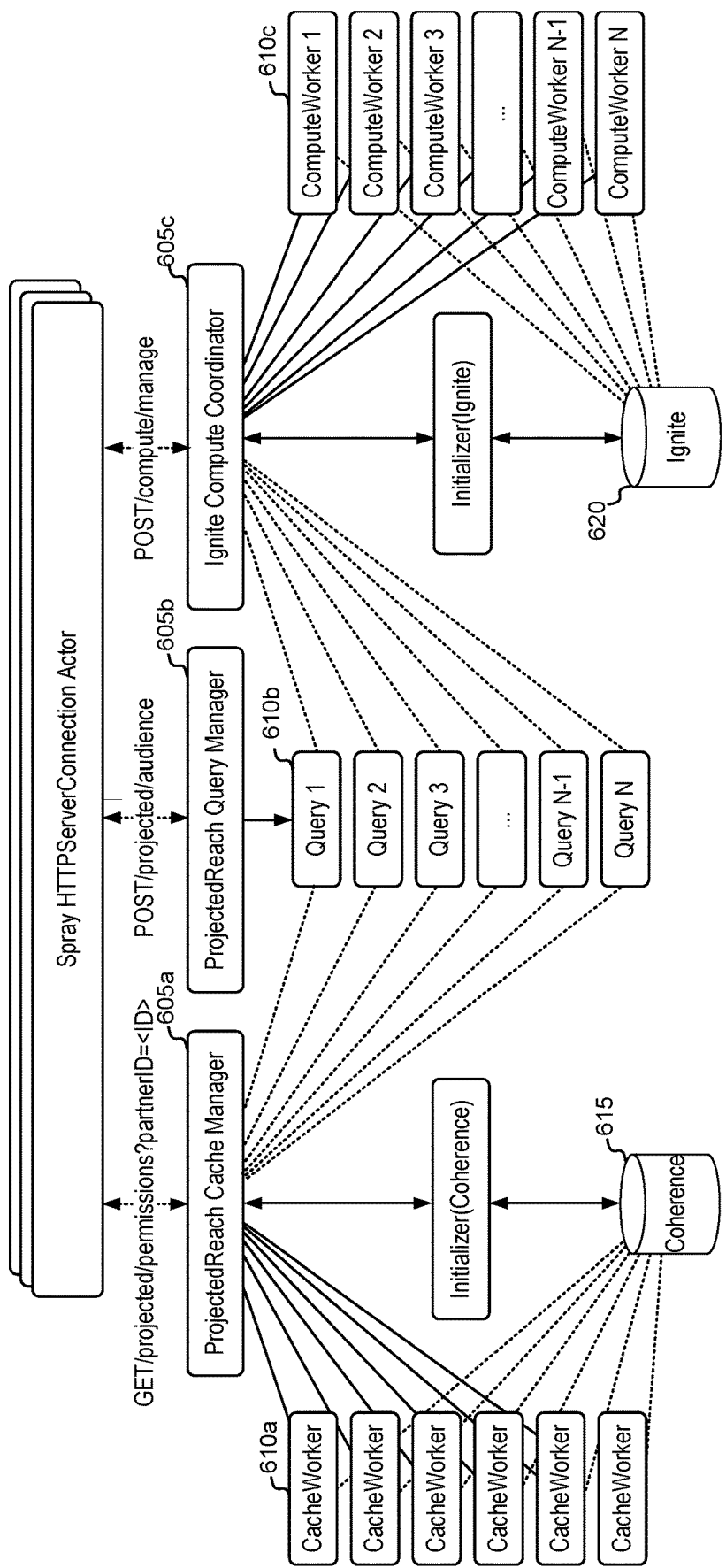
FIG. 6 shows an example of an bot-based architecture corresponding to a directed graph generated for an action.

FIG. 6 shows an example of an bot-based architecture corresponding to a directed graph generated for an action. In this example, a system is configured to quickly (e.g., within a half of a second) identify an estimated number of profiles that correspond to an intersection of multiple constraints as indicated in a request, which is defined to be the "reach" of the request.

The system includes three coordinating bots 605a, 605b and 605c to control and manage various processing bots (e.g., processing bots 610a, 610b and 610c). Throughput of the system can be dependent on the quantity of processing bots associated with any given coordinating bot.

Each coordinating bot 605a, 605b and 605c can start up in an idle state and wait for a dependency to be fulfilled. Once the dependency is fulfilled, the coordinating bot can transition to an active state. Once in the active state, or as part of transitioning to the active state, the coordinate bot can generate its own swarm of processing bots and broadcast a message over a communications fabric indicating that it is available. Each coordinating bot can monitor chatter over the communications fabric and assess the chatter based on rules to determine whether and/or when to toggle its states (from active to inactive or the converse) based on indications pertaining to service quality and backend system availability. A state transition of one coordinating bot (e.g., coordinating bot 605a) may trigger a similar or same state transition of the other coordinating bots (e.g., coordinating bots 605b, 605c).

For example, if one or more processing bots 610c associated with a particular coordinating bot 605c detect a compute system failure or service degradation, coordinating bot 605c can initiate throttling of requests to elevate service quality (by putting lesser pressure on the back-end) or toggle its state to become idle and thus signal service unavailability. This in turn, causes the other coordinating bots 605a, 605b to react similarly. Thus, user-device requests can be handled to ensure that valid responses are returned and to reduce encountering of back-end systems issues.

More specifically, in the illustrated instance, coordinating bot 605a acts as the coordinator for the query swarm of processing bots 610a. The swarm is dynamic and new members join the swarm to process new queries. The subsystem initializes to an Idle/NOT_READY state and switches to a READY state when the various subsystems it depends upon start sending it messages to indicate their availability. HTTP requests for reach numbers are not served until permissions data-store and profiles data-store handles are available. For each request, that is received after initialization, the following actions (in the indicated order or in another order) can be performed:

- JSON unmarshalling at the HTTP level converts the request into an expression tree and generates a request identifier. A request object is defined to include the expression tree and to be associated with the request identifier.
- The request object is passed to the Query Manager coordinating bot 605b, which accepts the request if it is in a state to accept requests.
- A new Query Processing Bot 610b is created and added to the swarm of processing bots coordinated by Query Manager coordinating bot 605b.
- The Query Processing Bot 610b broadcasts a message over a communication fabric, and the Cache coordinating bot 605a detects the message and initiates resolving the request permissions asynchronously. (Messages from multiple Query Processing Bots can be assigned different metadata corresponding to an associated query, such that they are distinguishable and can be appropriately filtered by other bots.) Cache coordinating bot 605a generates a new Cache Processing Bot 610a to resolve the permissions using a permissions data store 615 that maintains permission data.
- If permissions cannot be resolved (e.g., if permission is denied), an denied indication can be communicated. The Query processing Bot 610b can trigger a denial response to be returned responsive to the request and can broadcast an indication that processing of the request is complete.
- If the permissions are resolved, the Query Processing Bot 610b transforms the request expression tree to a new form of a category expression tree, which is consumable to generate data-store requests for profile information. The Query Processing Bot 610b applies permissions to this expression and links the two trees together via a set of tree node IDs.
- The Query Processing Bot 610b then messages the Compute Coordinating Bot 605c(e.g., by broadcasting a message over the communications fabric that will be detected by the Compute Coordinating Bot 605c) with an instruction to compute reach. Compute Coordinating Bot 605c generates a Compute Processing Bot 610c to perform this computation.
- The Compute Processing Bot 610c identifies, for each node of the tree, a reach number. The numbers can be identified by querying one or more internal and/or external data stores (e.g., an profiles data store 620). These numbers can be applied to the expression tree so as to generate a result object. The Compute Processing Bot returns the result object to the Query Processing Bot 610b (via the communications fabric).
- The Query Processing Bot 610b detects that its assigned tasks are complete and terminates itself. An indication of the termination is broadcast over the communications fabric.
- The Query Coordinating Bot 605b detects the termination and calculates a quality-of-service metric for the action. A response that identifies the overall reach and/or the quality of service can be returned.
- During any of the above steps, the Query Processing Bot 610a can respond to out-of-band messages that either terminate, toggle state or throttle service quality in coordination with the Query Coordinating Bot 605a.

The Query Coordinating Bot 605b and Query Processing Bot 610b can work off of a separate dispatcher (query-dispatcher) to keep query orchestration threads isolated (from other services like cache lookups). When requests are received while one or more data stores are not yet initialized, the request is immediately responded to and the Query Coordinating Bot 610a re-attempts initialization, by sending another message to the Initializer. It is possible that several requests for initialization may pile up in the initializer's mailbox. Once the Initializer is done with Initialization, however, it sends a message signaling the completion to the Query Coordinating Bot 605b (and/or Cache Manager Coordinating Bot 605a), such that the associated processing can be terminated. In doing so, it destructs the mailbox with the redundant initialization requests.

Thus, techniques disclosed herein can dynamically reconfigure bot architecture so as to efficiently process requests. The communications fabric allows communications to be distributed without heavily burdening a single point manager (e.g., a hub). This distributed communication allows processing of requests to be potentially paused or stopped prior to detecting an error or unresponsiveness. The asynchronous task performance and communications fabric facilitate increases in throughput and reduce resource usage.

Notably, the efficiencies of the system can depend on a stringency of one or more rules. For example, if a rule indicates that processing is to be terminated in response to a small number of undesired events, processing may be stopped in instances where system-wide disturbances are not truly occurring. Meanwhile, if a threshold of events is high, substantial processing may be performed across requests prior to individually Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
   detecting a request for data;
   retrieving a chatter-processing rule that indicates one or more criteria for changing operation states while performing bot-based processing;
   assigning at least part of the request to a coordinating bot of a processing subsystem of a computing system;
   generating, by the coordinating bot, a set of processing bots to operate at the processing subsystem and to perform processing for the at least part of the request, each processing bot of the set of processing bots being assigned one or more tasks of a set of tasks to perform, wherein the set of tasks is defined such that performance of the set of tasks corresponds to processing of the at least part of the request;
   enabling a communications fabric to route communications broadcasted from individual processing bots within a swarm of bots to other processing bots within a swarm of bots, the swarm of bots including the set of processing bots;
   performing autonomous processing across the set of processing bots by, for each bot of the set of processing bots, performing the assigned one or more tasks of the set of tasks; and
   during at least part of the autonomous processing and at a processing bot of the swarm of bots:
      receiving one or more communications across the communications fabric, each communication of the one or more communications being from another processing bot of the swarm of bots and indicating a status of the other processing bot or a result of performance of part or all of the one or more tasks assigned to the other processing bot;
      determining, based on the one or more communications and the chatter-processing rule, that a criterion of the one or more criteria is satisfied; and
      changing an operation state of the processing bot to cease performance of the one or more tasks.

2. The method as recited in claim 1, further comprising:
   generating a directed graph based on the request, the directed graph including an ordered set of nodes, wherein each node of the ordered set of nodes is associated with an action to be performed, wherein assigning the at least part of the request to the coordinating bot includes assigning a particular action associated with a particular node to the coordinating bot;
identifying the set of tasks as collectively corresponding to the action; and
for each other node of the ordered set of nodes in the directed graph:
assigning the action associated with the other node to another coordinating bot of the processing subsystem;
generating, by the other coordinating bot, one or more additional processing bots to operate at the processing subsystem and to perform processing for the other actions, each additional processing bot of the one or more additional processing bots being assigned one or more other tasks to perform that correspond to at least part of the assigned action, wherein the swarm of bots includes the one or more additional processing bots; and
performing autonomous processing across the one or more additional processing bots.

3. The method as recited in claim 1, wherein the swarm of bots includes the coordinating bot, and wherein the method further comprises, at the coordinating bot:
receiving the one or more communications across the communications fabric;
determining, based on the one or more communications and the chatter-processing rule, that the criterion of the one or more criteria is satisfied; and
generating a new processing bot to repeatedly perform a monitoring task configured to:
determine whether an operation or accessibility of a local or remote resource that corresponds to the set of tasks has changed; and
upon determining that the operation or accessibility has changed, broadcast an indication of the changed operation or accessibility across the communications fabric.

4. The method as recited in claim 1, wherein the swarm of bots includes a request-scheduler bot of the processing subsystem, and wherein the method further comprises, at the request-scheduler bot:
receiving the one or more communications across the communications fabric;
determining, based on the one or more communications and the chatter-processing rule, that the criterion of the one or more criteria is satisfied;
identifying a resource associated with a subset of the set of tasks associated with the one or more communications;
receiving a new request;
determining that processing the new request includes using the resource; and
outputting a response to the new request that indicates that the new request is not accepted.

5. The method as recited in claim 1, further comprising, at the processing bot and in response to receiving each communication of the one or more communications:
determining that the status or result indicated in the communication corresponds to an event type as identified in the criterion; and
incrementing a tracked chatter metric that is locally managed at the processing bot;
wherein determining that the criterion is satisfied includes determining that the tracked chatter metric exceeds a predefined threshold as identified in the criterion.

6. The method as recited in claim 1, further comprising:
in response to determining that the criterion is satisfied:
identifying, from a memory of the processing bot, one or more incomplete results obtained through partial processing of the one or more tasks assigned to the processing bot; and
storing the one or more incomplete results;
determining that the criterion is no longer satisfied;
in response to determining that the criterion is no longer satisfied:
retrieving the one or more incomplete results;
enabling processing of the one or more incomplete results to resume at the processing bot or at a new processing bot.

7. The method as recited in claim 1, further comprising, during at least part of the autonomous processing and at a second processing bot of the swarm of bots:
receiving the one or more communications across the communications fabric;
detecting, prior to receipt of at least one of the one or more communications, a modified chatter-processing rule that indicates a new criterion for changing the operation states;
determining, based on the one or more communications and the modified chatter-processing rule, that the new criterion is not satisfied, wherein the second processing bot does not change its operation in response to the one or more communications.

8. A computer-program product tangibly embodied in a non-transitory machine-readable storage medium, including instructions configured to cause a processing subsystem of a computing system to perform actions including:
detecting a request for data;
retrieving a chatter-processing rule that indicates one or more criteria for changing operation states while performing bot-based processing;
assigning at least part of the request to a coordinating bot of the processing subsystem of the computing system;
generating, by the coordinating bot, a set of processing bots to operate at the processing subsystem and to perform processing for the at least part of the request, each processing bot of the set of processing bots being assigned one or more tasks of a set of tasks to perform, wherein the set of tasks is defined such that performance of the set of tasks corresponds to processing of the at least part of the request;
enabling a communications fabric to route communications broadcasted from individual processing bots within a swarm of bots to other processing bots within a swarm of bots, the swarm of bots including the set of processing bots;
performing autonomous processing across the set of processing bots by, for each bot of the set of processing bots, performing the assigned one or more tasks of the set of tasks; and
during at least part of the autonomous processing and at a processing bot of the swarm of bots:
receiving one or more communications across the communications fabric, each communication of the one or more communications being from another processing bot of the swarm of bots and indicating a status of the other processing bot or a result of performance of part or all of the one or more tasks assigned to the other processing bot;
determining, based on the one or more communications and the chatter-processing rule, that a criterion of the one or more criteria is satisfied; and changing an operation state of the processing bot to cease performance of the one or more tasks.

9. The computer-program product as recited in claim 8, wherein the actions further include:
generating a directed graph based on the request, the directed graph including an ordered set of nodes, wherein each node of the ordered set of nodes is associated with an action to be performed, wherein assigning the at least part of the request to the coordinating bot includes assigning a particular action associated with a particular node to the coordinating bot;
identifying the set of tasks as collectively corresponding to the action; and
for each other node of the ordered set of nodes in the directed graph:
assigning the action associated with the other node to another coordinating bot of the processing subsystem;
generating, by the other coordinating bot, one or more additional processing bots to operate at the processing subsystem and to perform processing for the other actions, each additional processing bot of the one or more additional processing bots being assigned one or more other tasks to perform that correspond to at least part of the assigned action, wherein the swarm of bots includes the one or more additional processing bots; and
performing autonomous processing across the one or more additional processing bots.

10. The computer-program product as recited in claim 8, wherein the swarm of bots includes the coordinating bot, and wherein the actions further include, at the coordinating bot:
receiving the one or more communications across the communications fabric;
determining, based on the one or more communications and the chatter-processing rule, that the criterion of the one or more criteria is satisfied; and
generating a new processing bot to repeatedly perform a monitoring task configured to:
determine whether an operation or accessibility of a local or remote resource that corresponds to the set of tasks has changed; and
upon determining that the operation or accessibility has changed, broadcast an indication of the changed operation or accessibility across the communications fabric.

11. The computer-program product as recited in claim 8, wherein the swarm of bots includes a request-scheduler bot of the processing subsystem, and wherein the actions further include, at the request-scheduler bot:
receiving the one or more communications across the communications fabric;
determining, based on the one or more communications and the chatter-processing rule, that the criterion of the one or more criteria is satisfied;
identifying a resource associated with a subset of the set of tasks associated with the one or more communications;
receiving a new request;
determining that processing the new request includes using the resource; and
outputting a response to the new request that indicates that the new request is not accepted.

12. The computer-program product as recited in claim 8, wherein the actions further include, at the processing bot and in response to receiving each communication of the one or more communications:
determining that the status or result indicated in the communication corresponds to an event type as identified in the criterion; and
incrementing a tracked chatter metric that is locally managed at the processing bot;
wherein determining that the criterion is satisfied includes determining that the tracked chatter metric exceeds a predefined threshold as identified in the criterion.

13. The computer-program product as recited in claim 8, wherein the actions further include:
in response to determining that the criterion is satisfied:
identifying, from a memory of the processing bot, one or more incomplete results obtained through partial processing of the one or more tasks assigned to the processing bot; and
storing the one or more incomplete results;
determining that the criterion is no longer satisfied;
in response to determining that the criterion is no longer satisfied:
retrieving the one or more incomplete results;
enabling processing of the one or more incomplete results to resume at the processing bot or at a new processing bot.

14. The computer-program product as recited in claim 8, wherein the actions further include, during at least part of the autonomous processing and at a second processing bot of the swarm of bots:
receiving the one or more communications across the communications fabric;
detecting, prior to receipt of at least one of the one or more communications, a modified chatter-processing rule that indicates a new criterion for changing the operation states;
determining, based on the one or more communications and the modified chatter-processing rule, that the new criterion is not satisfied, wherein the second processing bot does not change its operation in response to the one or more communications.

15. A computing system comprising:
a processing subsystem that includes one or more data processors; and
a non-transitory computer readable storage medium containing instructions which when executed on the processing subsystem, cause the processing subsystem to perform actions including:
detecting a request for data;
retrieving a chatter-processing rule that indicates one or more criteria for changing operation states while performing bot-based processing;
assigning at least part of the request to a coordinating bot of the processing subsystem of the computing system;
generating, by the coordinating bot, a set of processing bots to operate at the processing subsystem and to perform processing for the at least part of the request, each processing bot of the set of processing bots being assigned one or more tasks of a set of tasks to perform, wherein the set of tasks is defined such that performance of the set of tasks corresponds to processing of the at least part of the request;
enabling a communications fabric to route communications broadcasted from individual processing bots within a swarm of bots to other processing bots within a swarm of bots, the swarm of bots including the set of processing bots;
performing autonomous processing across the set of processing bots by, for each bot of the set of processing bots, performing the assigned one or more tasks of the set of tasks; and during at least part of the autonomous processing and at a processing bot of the swarm of bots:

receiving one or more communications across the communications fabric, each communication of the one or more communications being from another processing bot of the swarm of bots and indicating a status of the other processing bot or a result of performance of part or all of the one or more tasks assigned to the other processing bot;

determining, based on the one or more communications and the chatter-processing rule, that a criterion of the one or more criteria is satisfied; and changing an operation state of the processing bot to cease performance of the one or more tasks.

16. The system as recited in claim 15, wherein the actions further include:

generating a directed graph based on the request, the directed graph including an ordered set of nodes, wherein each node of the ordered set of nodes is associated with an action to be performed, wherein assigning the at least part of the request to the coordinating bot includes assigning a particular action associated with a particular node to the coordinating bot;

identifying the set of tasks as collectively corresponding to the action; and for each other node of the ordered set of nodes in the directed graph:

assigning the action associated with the other node to another coordinating bot of the processing subsystem;

generating, by the other coordinating bot, one or more additional processing bots to operate at the processing subsystem and to perform processing for the other actions, each additional processing bot of the one or more additional processing bots being assigned one or more other tasks to perform that correspond to at least part of the assigned action, wherein the swarm of bots includes the one or more additional processing bots; and performing autonomous processing across the one or more additional processing bots.

17. The system as recited in claim 15, wherein the swarm of bots includes the coordinating bot, and wherein the actions further include, at the coordinating bot:

receiving the one or more communications across the communications fabric;

determining, based on the one or more communications and the chatter-processing rule, that the criterion of the one or more criteria is satisfied; and generating a new processing bot to repeatedly perform a monitoring task configured to:

determine whether an operation or accessibility of a local or remote resource that corresponds to the set of tasks has changed; and upon determining that the operation or accessibility has changed, broadcast an indication of the changed operation or accessibility across the communications fabric.

18. The system as recited in claim 15, wherein the swarm of bots includes a request-scheduler bot of the processing subsystem, and wherein the actions further include, at the request-scheduler bot:

receiving the one or more communications across the communications fabric;

determining, based on the one or more communications and the chatter-processing rule, that the criterion of the one or more criteria is satisfied;

identifying a resource associated with a subset of the set of tasks associated with the one or more communications;

receiving a new request;

determining that processing the new request includes using the resource; and outputting a response to the new request that indicates that the new request is not accepted.

19. The system as recited in claim 15, wherein the actions further include, at the processing bot and in response to receiving each communication of the one or more communications:

determining that the status or result indicated in the communication corresponds to an event type as identified in the criterion; and incrementing a tracked chatter metric that is locally managed at the processing bot;

wherein determining that the criterion is satisfied includes determining that the tracked chatter metric exceeds a predefined threshold as identified in the criterion.

20. The system as recited in claim 15, wherein the actions further include:

in response to determining that the criterion is satisfied:

identifying, from a memory of the processing bot, one or more incomplete results obtained through partial processing of the one or more tasks assigned to the processing bot; and storing the one or more incomplete results;

determining that the criterion is no longer satisfied;

in response to determining that the criterion is no longer satisfied:

retrieving the one or more incomplete results;

enabling processing of the one or more incomplete results to resume at the processing bot or at a new processing bot.

* * * * *